Aug. 21, 1956 J. S. KILBY 2,759,854

METHOD OF MANUFACTURING CAPACITATORS

Filed June 20, 1951

*INVENTOR.*
JACK S. KILBY
*BY*
John W. Michael
ATTORNEY

United States Patent Office 2,759,854

Patented Aug. 21, 1956

2,759,854

METHOD OF MANUFACTURING CAPACITATORS

Jack S. Kilby, Milwaukee, Wis., assignor to Globe-Union Inc., Milwaukee, Wis., a corporation of Delaware Application June 20, 1951, Serial No. 232,484

5 Claims. (Cl. 117—217)

This invention relates to improvements in capacitors, particularly capacitors having a very thin dielectric and suitable for printed circuit use.

In the printed circuit art (see National Bureau of Standards Miscellaneous Publications No. 468 of November 15, 1947, and No. 192 of November 22, 1948), it has been the practice, where large capacitance is required, to mount separate ceramic disk or tube-type capacitors on the ceramic panel of the printed circuit. However, even these separate capacitors have a relatively thick dielectric in order to provide sufficient mechanical support. This lowers the attainable capacitance per unit of space required.

It is an object of this invention, therefore, to provide a capacitor which may be carried by the ceramic base plate of a printed circuit and have greatly increased capacitance rating over capacitors occupying substantially the same space.

Another object is to provide a capacitor for printed circuits which is compact and economical to make.

To obtain these objects the capacitor has one electrode carried by a suitable base or panel capable of being the support for a printed circuit. The dielectric consists of a relatively thin film of ceramic overlying such electrode and cured by firing in situ. The second electrode is mounted on such dielectric. The dielectric of such capacitor does not provide the structural support, such support being provided by the base. Hence, the dielectric may be relatively thin and, if desired, of high dielectric constant material. Relatively thin as used herein refers to thickness in the neighborhood of .003 inches or less while relatively thick refers to thickness in the neighborhood of .025 inches or greater. The dielectric is applied in slip or liquid form by silk screening or other process and is fired at curing temperatures after application. Thus each electrode applied before such firing must and does consist of a metal paint capable of withstanding temperatures reached in firing. Such paint is also inert to the dielectric and supporting base at such temperatures and will not oxidize and become non-conductive. Any electrode which is applied after firing may be of any metal which is a good conductor and may be applied by any of the well-known methods. The firing of the dielectric while being carried by the supporting base brings out its high dielectric constant characteristics without chance of breaking or cracking and thereby becoming ineffective as a dielectric, as is the case with separately formed capacitors. The capacitor so formed is also more compact than those heretofore available and is more rugged and less susceptible to moisture. Because it may be screened one capacitor may be applied with other capacitors and other elements of the printed circuit in one operation and thus it is very adaptable for printed circuit use.

The novel features which are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing in which:

Figure 1:
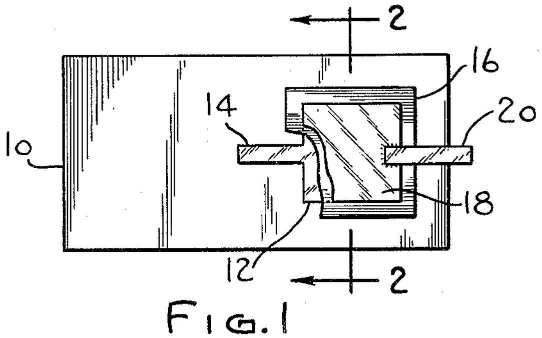
Fig. 1 is a view in top elevation of a single capacitor embodying the present invention mounted on a supporting base with parts being broken away for the sake of illustration.

Capacitors only are described herein and shown in the drawing. However, other diverse impedance elements of a printed circuit as well as additional capacitors may be applied to the supporting base in a well-known manner. The supporting base 10 to be suitable for use in a printed circuit is made of dielectric material, preferably ceramic. Because it does not constitute the dielectric of the capacitor it does not need to have a high dielectric constant. In the embodiments described, the base is made of a material with a low dielectric constant with sufficient thickness to provide good structural support. It will not create enough undesired capacitance coupling between any conductive elements mounted on it to effectively alter the over-all characteristics.

An inner electrode 12 is screened on the base 10 or applied in paint form in any of the other well-known ways. It is desirable to provide the electrode with an extension 14 to which leads or other circuity may be attached. The inner electrode 12 is made of metal paint which is capable of withstanding the temperatures at which the dielectric is fired. In this embodiment platinum paint is used and it is screened on to the base 10 over the desired area by the usual screening process. In addition to platinum paint it has been found that paint of other metals, such as palladium, rhenium and rhodium, are suitable. The metal must be able to withstand firing temperatures up to 2500° F. and at the same time must be sufficiently inert so as not to react with the materials of either the base 10 or the dielectric and oxidize and lose its conductive characteristics.

After the inner electrode 12 is applied, a relatively thin layer 16 of unfired ceramic material capable of producing a high dielectric constant when fired is applied over the electrode 12 and a part of the base 10 surrounding such electrode. However, the extension 14 remains exposed. This dielectric material is applied in a slip or liquid form by the silk screen process. The thickness of such layer does not exceed in the neighborhood of .003 inch. The application of the layer 16 is not limited to the silk screen process. It may be applied by spraying the material to the desired area or by masking such area and dipping the base 10 in the liquid dielectric material. There are many different types of ceramic dielectric material having a sufficiently high dielectric constant when fired to operate satisfactorily. The selection of the ceramic material depends entirely on the desired temperature coefficient and desired dielectric constant. It is desirable to mix the unfired ceramic material with a binder, a squeegee medium, and a solvent, in order to get the proper painting consistency. In this embodiment the ceramic paint consists of: 88% pure barium titanate; 10% of high viscosity ethyl cellulose N type; a squeegee medium known commercially as Dupont Squeegee Medium No. 5051; and 2% of ester gum binder. A solvent is used to thin this mixture to painting consistency.

After the layer 16 has been applied, the unit is then fired to cure the ceramic material in the layer 16 in the well-known manner and create in situ a relatively thin dielectric 16 having a high dielectric constant. In such firing temperatures may be as great as 2500° F. but this will not adversely affect the electrode 12 and cause it to lose its conductive quality. After the firing, an outer electrode 18 is applied to the surface of the dielectric 16. If other circuity, including a lead for the electrode 12, is to be applied to the base 10, this outer electrode will consist of the customary silver paint applied in a well-known manner and heat-bonded to the dielectric 16. Any other circuity will also be applied at the same time. A ribbon conductor 20 or other type of wire lead may be soldered to the outer electrode 18. However, it is not necessary that the outer electrode 18 consist of silver paint. It can be made from platinum paint in the same manner as the inner electrode 12. In such case the outer electrode 18 is applied to the layer 16 before firing such layer.

Figure 3:
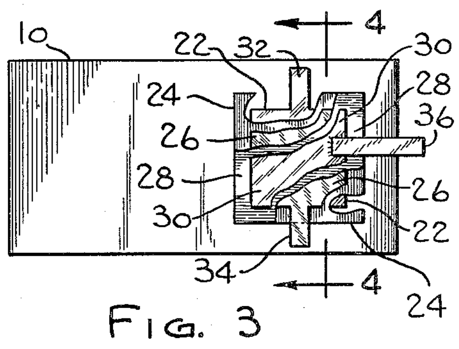
Fig. 3 is a view in top elevation of a multiple plate capacitor embodying the present invention mounted on a supporting base, with parts being broken away for the sake of illustration.
Figure 2:
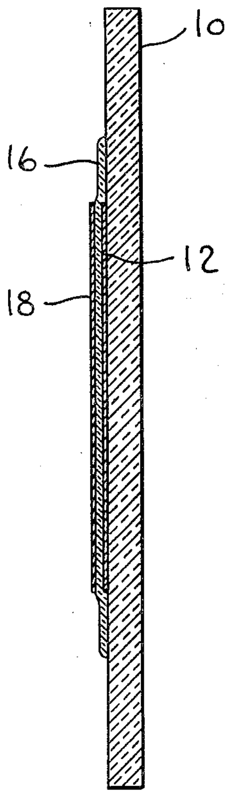
Fig. 2 is a greatly enlarged sectional view taken on line 2—2 of Fig. 1.
Figure 4:
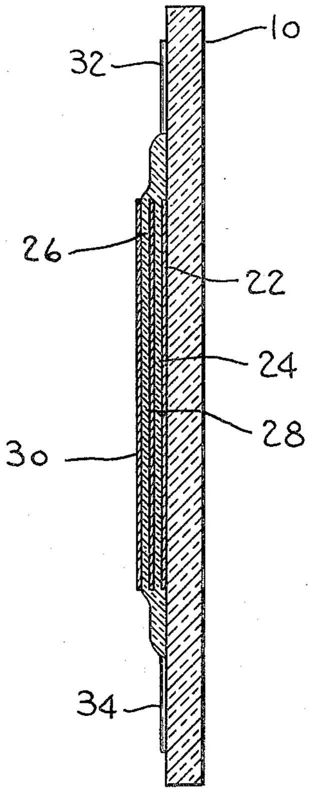
Fig. 4 is a greatly enlarged sectional view taken on line 4—4 of Fig. 3.

A multiple capacitor can also be made in substantially the same way as the single capacitor of Fig. 1. Such a multiple capacitor is shown in Fig. 3 and consists of an inner electrode 22, a first dielectric 24, an intermediate electrode 26, a second dielectric 28, and an outer electrode 30. The inner electrode 22 may be provided with an extension 32 and the intermediate electrode 26 may be provided with an extension 34. A flat ribbon conductor or other type of lead may be soldered to the outer electrode 30. In making the multiple capacitor of Figs. 3 and 4, all of the internal electrodes must consist of platinum paint or other metal paint capable of withstanding firing temperatures at which the dielectrics 24 and 28 are cured. In other respects, the method of making the multiple capacitor is the same as heretofore set forth for the capacitors of Figs. 1 and 2.

If no impedance elements other than capacitors are to be placed on the base 10 such base should be made from the same ceramic material as the dielectric 16. This insures that no reaction takes place between the base and the dielectric. However, when impedance elements other than capacitors are to be mounted on the base undesired coupling is avoided by making the base 10 of a lower dielectric constant ceramic material than that of the dielectric 16. Care must be taken in selecting the ceramic material of the base 10 and the dielectric 16 so that there will not be a reaction therebetween. In some instances it may be necessary to apply an intermediate layer to the base 10 before applying the electrode 12. Such intermediate layer which acts as a shield for the dielectric 16 may consist of the same material as the dielectric 16. Hence even if it does react with the material of base 10, such reaction will not spoil the capacitance rating as such intermediate layer does not constitute the dielectric. However, many choices of materials are available to those skilled in the art of ceramics which will give the desired low K in the base 10 and high K in the dielectric 16 and still not have the high K characteristic of the dielectric 16 spoiled by reaction between the base 10 and dielectric 16 during the firing process.

Although several embodiments of the invention are shown and described herein, it will be understood that this application is intended to cover such other changes or modifications as come within the spirit of the invention or scope of the following claims.

I claim:

1. In the method of making a capacitor, the provision of a relatively thick base of fired ceramic material forming a permanent support for the capacitor during and after the firing hereinafter mentioned, permanently mounting on said base a layer of metal paint having a melting point in excess of 2500° F. and inert to said base and the hereinafter mentioned dielectric at temperatures up to 2500° F., applying to said layer of metal paint and to said base a relatively thin layer of unfired ceramic material including barium titanate in sufficient amounts to provide a relatively high dielectric constant when fired and firing said base and said layers at temperatures up to 2500° F. to cure said ceramic layer into a dielectric having a high dielectric constant and bond said metal paint to said ceramic layer to form an electrode for said capacitor without adversely affecting the conductive quality of said electrode.

2. The method as claimed in claim 1 in which said metal paint consists of platinum paint.

3. The method as claimed in claim 1 in which said metal paint consists of palladium paint.

4. The method as claimed in claim 1 in which said metal paint consists of rhenium paint.

5. The method as claimed in claim 1 in which said metal paint consists of rhodium paint.

References Cited in the file of this patent

UNITED STATES PATENTS

| | | |
|---|---|---|
| 2,389,419 | Deyrup et al. | Nov. 20, 1945 |
| 2,389,420 | Deyrup et al. | Nov. 20, 1945 |
| 2,493,199 | Khouri | Jan. 3, 1950 |
| 2,496,095 | Kallmann | Jan. 31, 1950 |
| 2,531,389 | Brandt | Nov. 28, 1950 |
| 2,566,666 | Khouri | Sept. 4, 1951 |
| 2,582,931 | Kodama | Jan. 15, 1952 |

OTHER REFERENCES

Printed Circuit Techniques, National Bureau of Standards Circular 468, 1947, pp. 31, 32.

Monack: The Glass Industry, January 1947, pp. 21–24.